(No Model.)
D. L. HOLDEN.
REFRIGERATING APPARATUS.
No. 484,913. Patented Oct. 25, 1892.
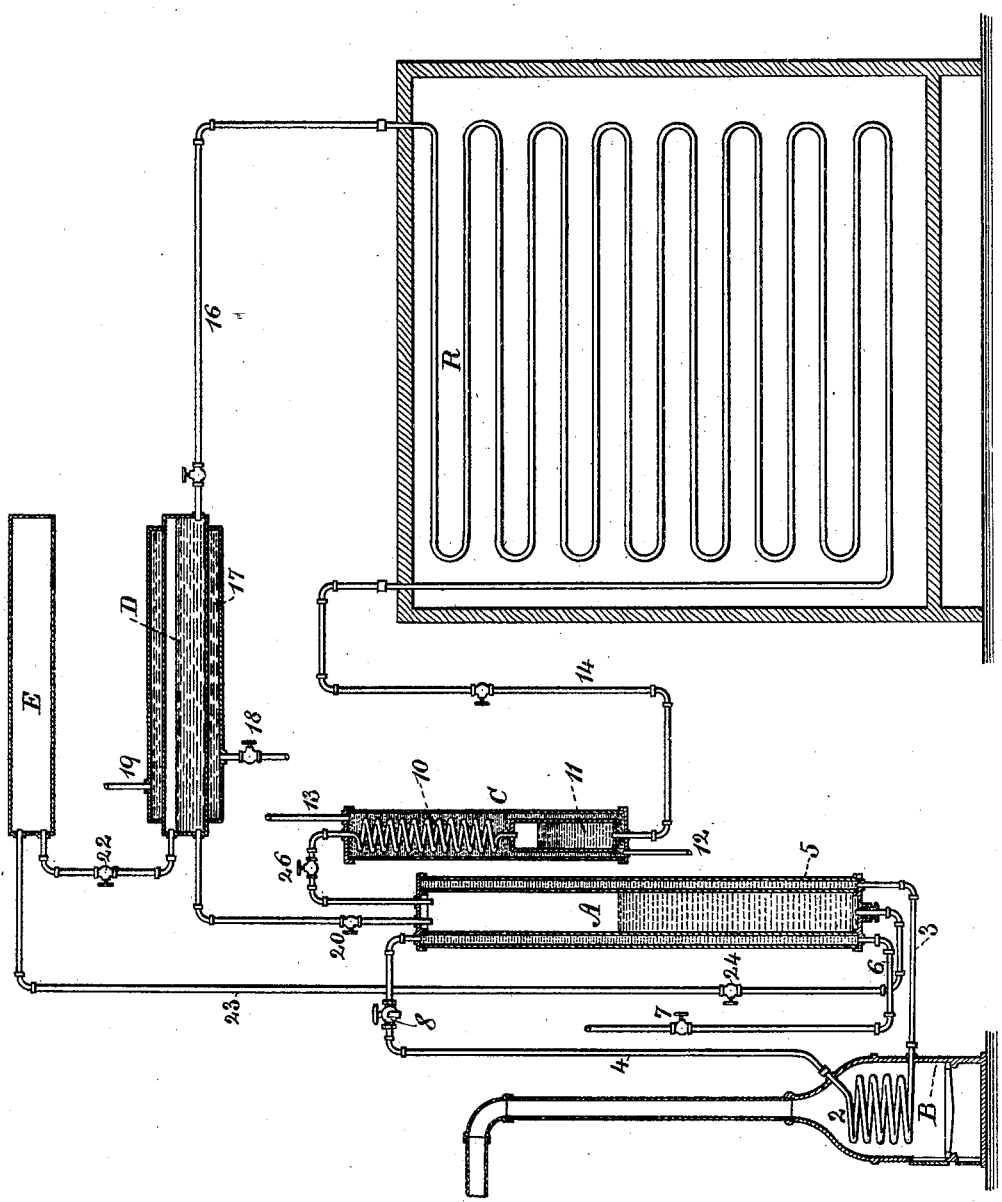

UNITED STATES PATENT OFFICE.

DANIEL L. HOLDEN, OF NEW YORK, N. Y.

REFRIGERATING APPARATUS.

SPECIFICATION forming part of Letters Patent No. 484,913, dated October 25, 1892.

Application filed December 12, 1891. Serial No. 414,810. (No model.)

*To all whom it may concern:*

Be it known that I, DANIEL L. HOLDEN, a citizen of the United States, residing at the city and State of New York, have invented an Improvement in Refrigerating Apparatus, of which the following is a specification.

This invention is made with special reference to the production of a refrigerating apparatus adapted to hotels, restaurants, &c., and in which the liquid ammonia passes into the refrigerating-chamber and the vapor or gaseous ammonia from the pipes of such refrigerating apparatus is absorbed and then passed into the still. In my present invention the ammonia is driven off from the still to a condenser, where it is condensed and the liquid passes into the pipes of the refrigerating apparatus and the vapors pass into an absorber, which is kept in a cool condition, and after the ammonia has been driven off from the still the weak liquor is passed by the pressure of the still to a secondary receiver, and the liquid into which the ammonia has been absorbed is allowed to run into the still, and after this has been done the weak liquor from the secondary receiver is passed into the absorbing-vessel and the operation repeated.

In the drawing I have represented the present improvement by a diagrammatic vertical section.

The still A is of any desired character. I have represented the same as a vertical cylinder, and the devices employed for heating this still may be a gas-burner or other source of heat applied directly or intermediately.

I have represented a heater B in the form of a casing for the reception of fuel or a burner, and a coil of pipe 2, with the pipes 3 and 4, leading to the jacket 5 around the still A, so that the still will be heated by water circulated through the space between the still and the jacket, and when the still is to be cooled water may be admitted through the pipe 6 and the cock 7 to the bottom of the still and pass off through the pipe 4 and cock 8. The ammonia-vapors driven off from the still pass into the condenser C, which is of suitable character. I prefer to make use of the coil 10, by which the ammonia is condensed and the liquid ammonia is received into the vessel 11, and the condenser can be cooled by water supplied through the pipe 12 and passing off by the pipe 13. The liquid ammonia passes by the pipe 14 and cock to any suitable refrigerating chamber or apparatus. I have illustrated such a refrigerator at R, and the liquid ammonia as it volatilizes absorbs the heat and cools the refrigerating-chamber R, and the volatilized ammonia passes by the pipe 16 to the absorbing-vessel D, which vessel is of suitable size, and it is preferably surrounded with a jacket 17, to which water is admitted by a pipe 18 and passes off by the pipe 19, and in this absorber D the weak ammonia liquid is contained, and the ammonia-vapors are absorbed in this weak liquor. A pipe and cock 20 connect the absorber D with the still A, so that when the still has been emptied the ammonia liquid from the absorber D is allowed to run into the still, and I provide a secondary receiver E for the weak solution at a higher elevation than the absorber, with a pipe and cock 22, connecting the same to the absorber D, and a pipe 23 and cock 24, connecting with the still A. After the ammonia has been distilled from the liquid in the vessel A and passed off to the condenser C the cock 26 is to be closed and the cock 24 opened, and the pressure within the still A drives the weak or spent liquor from the still A up by the pipe 23 into the secondary receiver E, after which the cock 24 is closed and the cock 20 is opened to allow the contents of the absorber D to run by gravity into the still A, and should it be necessary to cool off the still to lessen the pressure in the same this may be done by admitting water by the cock 7 and pipe 6 into the jacket around the still A and allowing the water to run away by the pipe 4 and cock 8, and after the contents of the absorber D have run by the cock and pipe 20 into the still A the cock 20 is closed and the cock 26 is opened, and the still A is heated up and the vapors pass off to the condenser as before, and after the cock 24 has been closed the cock 22 is opened and the weak liquor from the secondary receiver E runs by gravity down into the absorber D, and it is there cooled and ready for the reabsorption of the ammonia passing from the refrigerator by the pipe 16, and the aforesaid operations are repeated.

I claim as my invention—

The combination, with the still, the condenser, and the refrigerator and their connecting pipes and cocks in a refrigerating apparatus, of an absorber and a pipe by which the ammonia-vapors are conveyed from the refrigerator, and a pipe and cock to the still, and a secondary receiver for the weak solution at a higher elevation than the absorber, a pipe and cock connecting the same to the absorber, and a pipe and cock connecting the secondary receiver to the lower part of the still, so that the contents of the still can be forced by the pressure in the still up into the secondary receiver for the weak solution, and then the contents of the absorber can be transferred to the still by gravity, and then the contents of the secondary receiver are allowed to flow by gravity into the absorber, substantially as set forth.

Signed by me this 24th day of November, 1891.

DANIEL L. HOLDEN.

Witnesses:
GEO. T. PINCKNEY,
WILLIAM G. MOTT.